United States Patent
Park et al.

(10) Patent No.: US 8,675,343 B2
(45) Date of Patent: Mar. 18, 2014

(54) CONDUCTIVE PASTE FOR EXTERNAL ELECTRODE, MULTILAYERED CERAMIC ELECTRONIC COMPONENT USING THE SAME AND FABRICATION METHOD THEREOF

(75) Inventors: Myung Jun Park, Chungcheongbuk-do (KR); Sung Bum Sohn, Gyunggi-do (KR); Hyun Hee Gu, Gyunggi-do (KR); Chang Hoon Kim, Gyunggi-do (KR); Sang Hoon Kwon, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 183 days.

(21) Appl. No.: 13/407,219

(22) Filed: Feb. 28, 2012

(65) Prior Publication Data

US 2013/0063865 A1 Mar. 14, 2013

(30) Foreign Application Priority Data

Sep. 8, 2011 (KR) .................. 10-2011-0091234

(51) Int. Cl.
*H01G 4/06* (2006.01)
*H01G 4/228* (2006.01)
*H01G 5/01* (2006.01)
*H01B 1/02* (2006.01)

(52) U.S. Cl.
USPC .............. 361/321.3; 361/306.1; 361/278; 252/512; 252/514

(58) Field of Classification Search
USPC ............ 361/306.1, 321.3, 278; 252/512, 514
See application file for complete search history.

(56) References Cited

FOREIGN PATENT DOCUMENTS

| JP | 2002-270457 A | 9/2002 |
|---|---|---|
| KR | 10-2005-0048855 A | 5/2005 |
| KR | 2010133867 A * | 12/2010 |

* cited by examiner

*Primary Examiner* — Eric Thomas
*Assistant Examiner* — Arun Ramaswamy
(74) *Attorney, Agent, or Firm* — McDermott Will & Emery LLP

(57) ABSTRACT

There are provided a conductive paste for an external electrode, a multilayered ceramic electronic component using the same, and a fabrication method thereof. The conductive paste for external electrode includes: a conductive metal; and a conductive amorphous metal including a (Cu, Ni)-bZr-c(Al, Sn) that satisfies conditions of a+b+c=100, $20 \leq a \leq 60$, $20 \leq b \leq 60$, and $2 \leq c \leq 25$. A degradation of connectivity between external electrodes and internal electrodes and defective plating due to a glass detachment may be solved.

19 Claims, 2 Drawing Sheets

A - A'

CONDUCTIVE PASTE FOR EXTERNAL ELECTRODE, MULTILAYERED CERAMIC ELECTRONIC COMPONENT USING THE SAME AND FABRICATION METHOD THEREOF

CROSS-REFERENCE TO RELATED APPLICATIONS

This application claims the priority of Korean Patent Application No. 10-2011-0091234 filed on Sep. 8, 2011 in the Korean Intellectual Property Office, the disclosure of which is incorporated herein by reference.

BACKGROUND OF THE INVENTION

1. Field of the Invention

The present invention relates to a conductive paste for external electrodes, capable of resolving degradation in connectivity between external electrodes and internal electrodes and defective plating due to glass detachment, a multilayered ceramic electronic component using the same, and a fabrication method thereof.

2. Description of the Related Art

Recently, as electronic products have been reduced in size, a multilayered ceramic electronic component has been required to be small and to have a large capacity.

In line with the requirements for a multilayered ceramic electronic component to have a small size and a large capacity, external electrodes of the multilayered ceramic electronic component are also becoming thinner.

An external electrode paste may be formed using a conductive metal such as copper (Cu) as a main material in order to guarantee chip air-tightness and electrical connectivity with a chip, and formed using glass as an auxiliary material in order to fill an empty space when the metal is sintered to be contracted and provide bonding force between external electrodes and the chip.

As for the glass, oxide-based glass powder is generally used, and the external electrode paste is applied to an end portion of the chip and sintered to form external electrodes, and thereafter, nickel (Ni) and tin (Sn) are sequentially electroplated to form plated layers.

However, the addition of oxide-based glass to the external electrode paste to form external electrodes may have the following defects.

First, glass may cover the internal electrode in a firing process, damping connectivity between internal electrodes and external electrodes.

Second, since glass may be eluted to the outside of the external electrode layer in the firing process, defective plating may occur in a plating process after the firing process.

In particular, as external electrodes have become thinner, it has been difficult to implement a desired level of compactness (or denseness), and the possibility of a defective product has increased due to a lack or excess of glass in terms of high temperature behavior characteristics of the glass.

SUMMARY OF THE INVENTION

An aspect of the present invention provides a conductive paste for an external electrode capable of preventing degradation of connectivity between external electrodes and internal electrodes and defective plating due to glass detachment (or glass outflow), a multilayered ceramic electronic component, and a fabrication method thereof.

According to an aspect of the present invention, there is provided a conductive paste for an external electrode, including: a conductive metal; and a conductive amorphous metal including a (Cu, Ni)-bZr-c(Al, Sn) that satisfies conditions of $a+b+c=100$, $20 \leq a \leq 60$, $20 \leq a \leq 60$, and $2 \leq c \leq 25$.

An average particle diameter of the amorphous metal powder may range from 0.5 μm to 5.0 μm.

The conductive metal may have a content of 40 to 60 parts by weight over 100 parts by weight of the conductive paste.

The conductive metal may be one or more selected from the group consisting of copper (Cu), nickel (Ni), silver (Ag), and silver-palladium (Ag—Pd).

According to another aspect of the present invention, there is provided a multilayered ceramic electronic component including: a ceramic main body including a dielectric layer; first and second internal electrodes disposed to face each other with the dielectric layer interposed therebetween within the ceramic main body; and a first external electrode electrically connected to the first internal electrodes and a second external electrode electrically connected to the second internal electrodes, wherein the content of dissolved oxygen within the first and second external electrodes is 100 ppm or lower.

The first and second external electrodes may be formed by applying a conductive paste for an external electrode (or an external electrode conductive paste) including a conductive metal, and a conductive amorphous metal including a (Cu, Ni)-bZr-c(Al, Sn) that satisfies conditions of $a+b+c=100$, $20 \leq a \leq 60$, $20 \leq b \leq 60$, and $2 \leq c \leq 25$, to the ceramic main body.

An average particle diameter of the amorphous metal powder may range from 0.5 μm to 5.0 μm.

The conductive metal may have the content of 40 to 60 parts by weight over 100 parts by weight of the conductive paste.

The conductive metal may be one or more selected from the group consisting of copper (Cu), nickel (Ni), silver (Ag), and silver-palladium (Ag—Pd).

According to another aspect of the present invention, there is provided a multilayered ceramic electronic component including: a ceramic main body including a plurality of dielectric layers; a plurality of first and second internal electrodes disposed to face each other within the ceramic main body with each of the plurality of dielectric layers interposed therebetween; and a first external electrode electrically connected to the first internal electrodes and a second external electrode electrically connected to the second internal electrodes, wherein the content of dissolved oxygen within the first and second external electrodes is 100 ppm or lower.

The first and second external electrodes may be formed by applying a conductive paste for an external electrode including a conductive metal, and a conductive amorphous metal including a (Cu, Ni)-bZr-c(Al, Sn) that satisfies conditions of $a+b+c=100$, $20 \leq a \leq 60$, $20 \leq b \leq 60$, and $2 \leq c \leq 25$, to the ceramic main body.

An average particle diameter of the amorphous metal powder may range from 0.5 μm to 5.0 μm.

The conductive metal may have the content of 40 to 60 parts by weight over 100 parts by weight of the conductive paste.

The conductive metal may be one or more selected from the group consisting of copper (Cu), nickel (Ni), silver (Ag), and silver-palladium (Ag—Pd).

According to another aspect of the present invention, there is provided a method of fabricating a multilayered ceramic electronic component, including: preparing a ceramic main body including a dielectric layer and first and second internal electrodes disposed to face each other with the dielectric layer interposed therebetween; preparing a conductive paste for an external electrode including a conductive metal, and a conductive amorphous metal including a (Cu, Ni)-bZr-c(Al, Sn) that satisfies conditions of a+b+c=100, 20≤a≤60, 20≤b≤60, and 2≤c≤25; applying the external electrode paste to the ceramic main body so as to be electrically connected to the first and second internal electrodes; and firing the ceramic main body to form the first and second external electrodes.

An average particle diameter of the amorphous metal powder may range from 0.5 μm to 5.0 μm.

The conductive metal may have the content of 40 to 60 parts by weight over 100 parts by weight of the conductive paste.

The conductive metal may be one or more selected from the group consisting of copper (Cu), nickel (Ni), silver (Ag), and silver-palladium (Ag—Pd).

The content of dissolved oxygen within the first and second external electrodes may be 100 ppm or lower.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
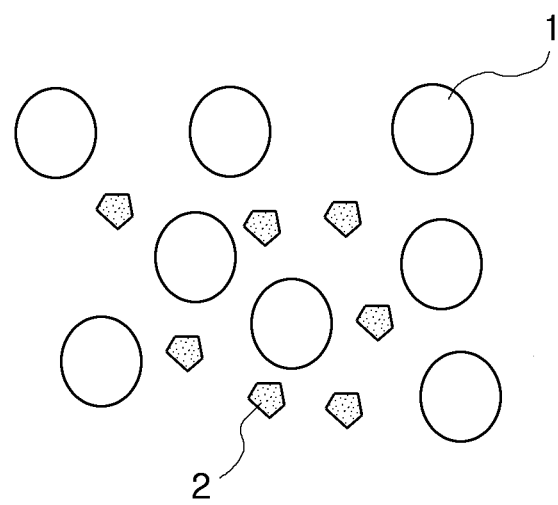
FIG. 1 is a schematic view of a conductive paste for an external electrode according to an embodiment of the present invention.

The present invention may be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Embodiments of the present invention will now be described in detail with reference to the accompanying drawings.

FIG. 1 is a schematic view of a conductive paste for an external electrode according to an embodiment of the present invention.

With reference to FIG. 1, a conductive paste for an external electrode (or an external electrode conductive paste) may include: a conductive metal 1; and a conductive amorphous metal 2 including a (Cu, Ni)-bZr-c(Al, Sn) that satisfies conditions of a+b+c=100, 20≤a≤60, 20≤b≤60, and 2≤c≤25.

The conductive paste for external electrode may include: the conductive metal 1; and the conductive amorphous metal 2 including a (Cu, Ni)-bZr-c(Al, Sn) that satisfies conditions of a+b+c=100, 20≤a≤60, 20≤b≤60, and 2≤c≤25; and may further include an organic vehicle including an organic binder and an organic solvent.

The conductive metal 1 may not be particularly limited so long as it may be formed of a material which may be electrically connected with the first and second internal electrodes 21 and 22 in order to form capacitance. For example, the conductive metal 1 may be one or more selected from the group consisting of copper (Cu), nickel (Ni), silver (Ag), and silver-palladium (Ag—Pd).

The conductive metal 1 may have the content of 40 to 60 parts by weight over 100 parts by weight of the conductive paste.

According to an embodiment of the present invention, since the conductive paste includes the conductive amorphous metal 2, eliminating the defect that may arise when the conductive paste includes an inorganic material such as glass, the conductive metal 1 may have the content of 40 to 60 parts by weight.

In detail, according to an embodiment of the present invention, the defect in which when an excessive amount of glass is included, glass covers the internal electrode in a firing process to dampen connectivity between the internal electrodes and the external electrodes, and the defect in which glass is eluted to the outside of the external electrode layer in the firing process to cause defective plating in a plating process after the firing process may not arise.

According to an embodiment of the present invention, the conductive metal 1 may have the content of 40 to 60 parts by weight over 100 parts by weight of the conductive paste.

In a case in which the conductive metal 1 has the content less than 40 parts by weight over the 100 parts by weight of the conductive paste, since the content of the amorphous metal may be excessive, damping (or degrading) connectivity between the internal electrodes and the external electrodes may be caused.

Also, when the conductive metal 1 has the content exceeding 60 parts by weight, the content of the amorphous metal may be reduced to degrade chip airtightness.

Meanwhile, the amorphous metal powder 2 includes a (Cu, Ni)-bZr-c(Al, Sn) that satisfies conditions of a+b+c=100, 20≤a≤60, 20≤b≤60, and 2≤c≤25.

The amorphous metal powder, a material assuming conductivity, may be evenly melted between the external electrodes and the ceramic main body during the firing process, strongly bonding the metal external electrode layers and the ceramic main body together.

Also, the amorphous metal powder may be very effective for hermetically sealing the end of the ceramic main body including internal electrodes.

Since the amorphous metal assumes conductivity, unlike the oxide-based glass, even when the amorphous metal melted during the firing operation covers the internal electrodes, electric connections may be obtained between the internal electrodes and the external electrodes.

Also, unlike the oxide-based glass, the amorphous metal assumes conductivity, so even when the amorphous metal melted during the firing operation is eluted to the outside of the external electrode layers, a plated layer may be formed.

The amorphous metal powder 2 according to an embodiment of the present invention may include a material represented by a formula of a (Cu, Ni)-bZr-c(Al, Sn) to allow for connectivity between the internal electrodes and the external electrodes and a formation of a plated layer even in the event of elution of the amorphous metal melted during the firing operation.

In order to uniformly bond the amorphous metal to the ceramic main body at a high temperature ranging from 400° C. to 1000° C., glass stability and wetting temperature may be of importance.

The glass stability ΔT may be represented by the difference between a crystallization temperature Tc and glass transition temperature Tg, i.e., by ΔT=Tc−Tg.

The glass stability ΔT is an important factor in terms of securing a stable viscosity behavior at a temperature at which the amorphous metal is bonded to the ceramic main body. According to an embodiment of the present invention, glass stability of the amorphous metal must be about 50° C. or higher in order to obtain sufficient bonding force between the ceramic main body and the external electrodes.

The wetting temperature Twet has close characteristics with a detachment phenomenon of the amorphous metal. When the wetting temperature of the conductive metal powder and the amorphous metal powder of the external electrode paste is higher than an electrode firing temperature, the amorphous metal in a molten liquid state may be eluted (i.e., may flow out) to the outside of the external electrode layer in the firing operation.

Also, when the wetting temperature with the conductive metal powder is too low as compared with the electrode firing temperature, the amorphous metal may be first softened and melted before an alloy reaction between the internal electrode and the external electrode, covering the internal electrodes, damping connectivity between the internal electrodes and external electrodes.

Thus, according to an embodiment of the present invention, in the above formula, the conditions of a+b+c=100, $20 \le a \le 60$, $20 \le b \le 60$ and $2 \le c \le 25$ may be satisfied, whereby the amorphous metal powder may be uniformly melted between the external electrodes and the ceramic main body during the firing operation, strongly bonding the metal external electrode layers and the ceramic main body together.

An average particle diameter of the amorphous metal powder 2 may range from 0.5 μm to 5.0 μm, but it is not particularly limited.

When the average particle diameter of the amorphous metal powder 2 is smaller than 0.5 μm, the amorphous metal may first be softened and melted to cover the internal electrodes, damping connectivity between the internal electrodes and the external electrodes.

Also, when the average particle diameter of the amorphous metal powder 2 exceeds 5.0 μm, the amorphous metal powder may be eluted to the outside of the external electrode layers during the firing operation, causing a defect.

Figure 2:
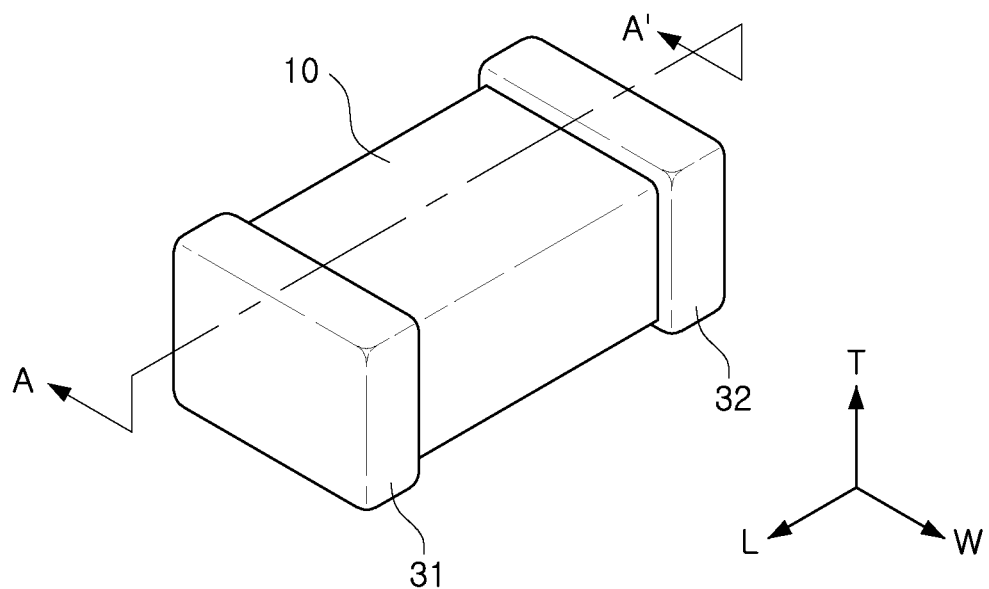
FIG. 2 is a schematic perspective view of a multilayered ceramic capacitor (MLCC) according to another embodiment of the present invention.

FIG. 2 is a schematic perspective view of a multilayered ceramic capacitor (MLCC) according to another embodiment of the present invention.

Figure 3:
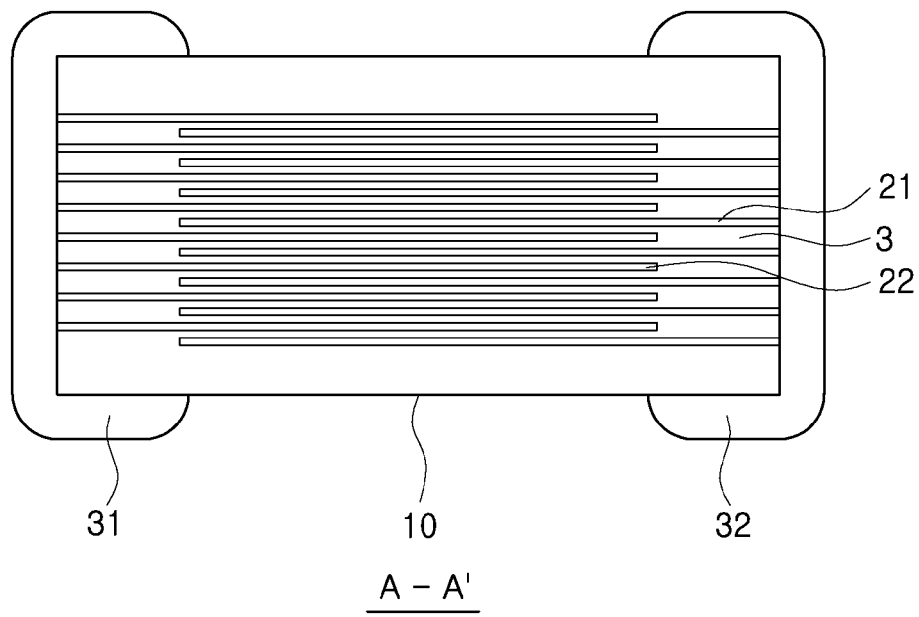
FIG. 3 is a cross-sectional view taken along line A-A' of FIG. 2.

FIG. 3 is a cross-sectional view taken along line A-A' in FIG. 2.

With reference to FIGS. 2 and 3, a multilayered ceramic electronic component according to another embodiment of the present invention may include: a ceramic main body 10 including a dielectric layer 3; first and second internal electrodes 21 and 22 disposed to face each other with the dielectric layer 3 interposed therebetween within the ceramic main body 10; and a first external electrode 31 electrically connected to the first internal electrodes 21 and a second external electrode 32 electrically connected to the second internal electrodes 22, and the content of dissolved oxygen within the first and second external electrodes 31 and 32 may be 100 ppm or lower.

Hereinafter, the multilayered ceramic electronic component according to an embodiment of the present invention will be described, and in this case, a multilayered ceramic capacitor (MLCC) will be taken as an example of the multilayered ceramic electronic component, but the present invention is not limited thereto.

In the multilayered ceramic capacitor (MLCC) according to an embodiment of the present invention, it is defined that a 'lengthwise direction' is the 'L' direction, a 'widthwise direction' is the 'W' direction, and a 'thicknesswise direction' is the 'T' direction in FIG. 2. Here, the 'thicknesswise direction' may be used as having the same concept as a 'lamination direction' in which dielectric layers are piled (or stacked).

According to an embodiment of the present invention, a raw material for forming the dielectric layers 3 is not particularly limited, so long as sufficient capacitance may be obtained therefrom. For example, the raw material of the dielectric layers 3 may be barium titanate ($BaTiO_3$).

As for the material of the dielectric layers 3, various materials such as a ceramic additive, an organic solvent, a plasticizer, a bonding agent, a dispersing agent, or the like, may be added to the powder such as barium titanate ($BaTiO_3$), or the like, according to the purpose of the present invention.

A material for forming the first and second internal electrodes 21 and 22 may not be particularly limited. For example, the first and second internal electrodes 21 and 22 may be formed by using a conductive paste formed of a material of one or more among silver (Ag), lead (Pb), platinum (Pt), nickel (Ni), and copper (Cu).

The MLCC according to an embodiment of the present invention may include the first external electrode 31 electrically connected to the first internal electrodes 21 and the second external electrode 32 electrically connected to the second internal electrodes 22.

The first and second external electrodes 31 and 32 may be electrically connected to the first and second internal electrodes 21 and 22, respectively, to form capacitance, and the second external electrode 32 may be connected to a different potential from that of the first external electrode 31.

According to an embodiment of the present invention, the first and second external electrodes 31 and 32 may be formed by applying a conductive paste for an external electrode including a conductive metal, and a conductive amorphous metal including a (Cu, Ni)-bZr-c(Al, Sn) that satisfies conditions of a+b+c=100, $20 \le a \le 60$, $20 \le b \le 60$, and $2 \le c \le 25$.

The characteristics of the conductive paste for external electrode have been described above, so a repeated description thereof will be omitted.

According to an embodiment of the present invention, the content of dissolved oxygen within the first and second external electrodes 31 and 32 may be 100 ppm or lower.

Since the first and second external electrodes 31 and 32 are formed to include an amorphous metal having conductivity, instead of an oxide-based glass, only a very small amount of dissolved oxygen may exist therein.

In detail, according to an embodiment of the present invention, since oxide-based glass is not included in the paste in forming the external electrodes, oxygen caused by oxide-based glass may not exist in the external electrodes.

Here, oxygen may be generated by a necessary reaction in the external electrode formation process, but it is very small and, in an embodiment of the present invention, the content of dissolved oxygen within the first and second external electrodes 31 and 32 may be 100 ppm or less.

According to an embodiment of the present invention, since the first and second external electrodes 31 and 32 include amorphous metal having conductivity, instead of oxide-based glass, the multilayered ceramic electronic component without the degradation of electrode connectivity between the internal electrodes and the external electrodes which may be caused after electrode firing and the defective plating due to the glass elution may be implemented.

A multilayered ceramic electronic component according to another embodiment of the present invention may include: the ceramic main body 10 including a plurality of dielectric layers 3; a plurality of the first and second internal electrodes 21 and 22 disposed to face each other with each of the dielectric layers 3 interposed therebetween within the ceramic main body 10; and the first external electrode 31 electrically connected to the first internal electrodes 21 and the second external electrode 32 electrically connected to the second internal electrodes 22. The content of dissolved oxygen within the first and second external electrodes is 100 ppm or lower.

The multilayered ceramic electronic component according to another embodiment of the present invention is the same as the multilayered ceramic electronic component according to former embodiment of the present invention, except that a plurality of the first and second internal electrode layers are laminated, so a repeated description thereof will be omitted.

Figure 4:
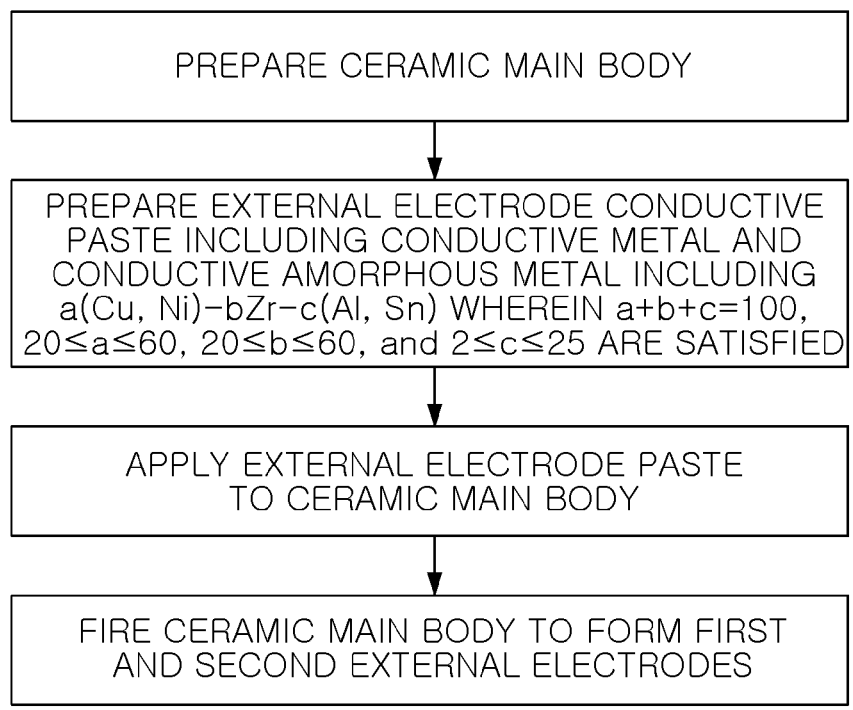
FIG. 4 is a flow chart illustrating a process of fabricating an MLCC according to another embodiment of the present invention.

FIG. 4 is a flow chart illustrating a process of fabricating an MLCC according to another embodiment of the present invention.

With reference to FIG. 4, a method of fabricating a multilayered ceramic electronic component according to another embodiment of the present invention may include: preparing the ceramic main body 10 including the dielectric layer 3 and the first and second internal electrodes 21 and 22 disposed to face each other with the dielectric layer 3 interposed therebetween; preparing a conductive paste for an external electrode including a conductive metal, and a conductive amorphous metal including a (Cu, Ni)-bZr-c(Al, Sn) that satisfies conditions of a+b+c=100, 20≤a≤60, 20≤b≤60, and 2≤c≤25; applying the external electrode paste to the ceramic main body 10 so as to be electrically connected to the first and second internal electrodes 21 and 22; and firing the ceramic main body 10 to form the first and second external electrodes 31 and 32.

In describing the method of fabricating a multilayered ceramic electronic component according to another embodiment of the present invention, a repeated description with respect to the MLCC according to a former embodiment of the present invention will be omitted.

Hereinafter, the method of fabricating a multilayered ceramic electronic component according to another embodiment of the present invention will be described in detail by taking a MLCC as an example, but the present invention is not limited thereto.

First, the ceramic main body 10 including the dielectric layer 3 and the first and second internal electrodes 21 and 22 disposed to face each other with the dielectric layer 3 interposed therebetween may be prepared.

The dielectric layer 3 may be formed as a ceramic green sheet, and here, the ceramic green sheet may be fabricated as follows. Powder such as barium titanate ($BaTiO_3$), or the like, is mixed with a ceramic additive, an organic solvent, a plasticizer, a bonding agent, and a dispersing agent, by using a basket mill, to form slurry, and the slurry is applied to a carrier film and then dried to form the ceramic green sheet having a thickness of a few μm.

A conductive paste may be dispensed to the green sheet, and an internal electrode layer may be formed by the conductive paste by moving a squeegee in one direction.

Here, the conductive paste may be formed of one of precious metal materials such as silver (Ag), lead (Pb), platinum (Pt), or the like, and materials among nickel (Ni) and copper (Cu), or may be formed by mixing at least two or more materials among them.

After the internal electrode layer is formed, the green sheet may be separated from the carrier film, and a plurality of green sheets may be laminated to form a laminate.

Then, the green sheet laminate may be compressed at relatively high temperature and high pressure, and the compressed sheet laminate is cut into portions of a certain size through a cutting process, thus fabricating a ceramic main body.

Thereafter, the conductive paste for external electrode including a conductive metal, and a conductive amorphous metal including a (Cu, Ni)-bZr-c(Al, Sn) that satisfies conditions of a+b+c=100, 20≤a≤60, 20≤b≤60, and 2≤c≤25 may be prepared.

The conductive metal may be one or more selected from the group consisting of copper (Cu), nickel (Ni), silver (Ag), and silver-palladium (Ag—Pd).

An average particle diameter of the amorphous metal powder may range from 0.5 μm to 5.0 μm.

The conductive metal may have the content of 40 to 60 parts by weight over 100 parts by weight of the conductive paste.

Thereafter, the external electrode paste may be applied to the ceramic main body 10 so as to be electrically connected to the first and second internal electrodes 21 and 22.

Finally, the ceramic main body 10 may be fired to form the first and second external electrodes 31 and 32.

The content of dissolved oxygen within the first and second external electrodes may be 100 ppm or lower.

Hereinafter, the present invention will be described in more detail through Examples, but the present invention is not limited thereto.

The Example was performed to test whether capacitance was degraded or whether the plating was defective with respect to the multilayered ceramic capacitor (MLCC), including first and second external electrodes including a conductive metal and a conductive amorphous metal including a (Cu, Ni)-bZr-c(Al, Sn) that satisfies conditions of a+b+c=100, 20≤a≤60, 20≤b≤60, and 2≤c≤25.

The MLCC according to the Example was fabricated through the following operations.

First, slurry formed to include powder such as barium titanate ($BaTiO_3$), or the like, was applied to a carrier film and dried to prepare a plurality of ceramic green sheets, thus forming dielectric layers.

The thickness of the dielectric layer after firing was formed to be 1 μm or smaller.

Next, a conductive paste for an internal electrode, including nickel particles having an average particle size of 0.05 to 0.2 μm, was prepared.

The conductive paste for internal electrode was applied to the green sheet through screen printing to form internal electrodes, and 200 internal electrodes were laminated to form a laminate.

And then, the laminate was compressed and cut to generate a chip having a size of 0603 standard, and the chip was fired at a temperature ranging from 1050° C. to 1200° C. under a reduced atmosphere of $H_2$ of 0.1% or less.

Thereafter, external electrodes were formed by using external electrode paste employing various compositions of the conductive amorphous metal and were subjected to a process such as plating, or the like, to fabricate an MLCC.

Table 1 below shows the comparison in glass stability ΔT, wetting temperature Twet, degradation of capacitance, and defective plating according to compositions and content of the conductive amorphous metal included in the conductive paste for forming external electrodes of the MLCC.

TABLE 1

| | | Comparative Example 1 | Comparative Example 2 | Example 1 | Example 2 | Example 3 | Example 4 | Example 5 | Example 6 | Comparative Example 3 | Comparative Example 4 | Comparative Example 5 |
|---|---|---|---|---|---|---|---|---|---|---|---|---|
| Amorphous metal composition (wt %) | Cu | | 10 | 20 | 40 | 0 | 45 | 50 | 25 | 65 | 30 | 49.5 |
| | Ni | | 5 | 0 | 10 | 45 | 0 | 0 | 30 | 0 | 0 | 0 |
| | Zr | | 60 | 60 | 40 | 45 | 45 | 40 | 40 | 30 | 65 | 49.5 |
| | Al | | 12.5 | 10 | 10 | 5 | 10 | 10 | 0 | 5 | 2.5 | 1 |
| | Sn | | 12.5 | 10 | 0 | 5 | 0 | 0 | 5 | 0 | 2.5 | 0 |
| | Sum | | 100 | 100 | 100 | 100 | 100 | 100 | 100 | 100 | 100 | 100 |
| Physical properties of amorphous metal | ΔT (°C.) | 80 | 45 | 50 | 55 | 67 | 65 | 68 | 70 | 43 | 40 | 38 |
| | Twet (°C.) | 720 | 820 | 770 | 750 | 715 | 725 | 730 | 720 | 790 | 805 | 830 |
| Paste evaluation result | Degradation of capacitance | X | X | ○ | ○ | ○ | ○ | ○ | ○ | X | X | X |
| | Defective plating | X | ○ | ○ | ○ | ○ | ○ | ○ | ○ | ○ | ○ | X |
| | Final decision | X | X | ○ | ○ | ○ | ○ | ○ | ○ | X | X | X |

Note 1)
Reference for evaluating capacitance degradation: X is defective and ○ is good
Note 2)
Reference for evaluating defective plating: X is defective and ○ is good With reference to Table 1, Comparative Example 1 is a case of applying a general external electrode paste containing oxide-based glass. It is noted that capacitance was degraded and defective plating was generated according to electrode firing.

In Comparative Example 2, glass stability ΔT of amorphous metal was lower than 50° C., and wetting temperature (Twet) with copper (Cu) had a high value, so it is noted that the capacitance was degraded.

Meanwhile, Examples 1 and 2 satisfy the numerical value range of the present invention, which had satisfying levels of glass stability ΔT and wetting temperature Twet with copper (Cu) without degrading capacitance and defective plating, obtaining good results.

Examples 3 to 6 had glass stability ΔT and wetting temperature Twet with copper (Cu) having excellent level of values without degrading capacitance and defective plating, obtaining good results.

Meanwhile, in Comparative Examples 3 to 5, glass stability ΔT of amorphous metal was lower than 50° C., and the wetting temperature Twet with copper (Cu) was high, having a degradation of capacitance.

To conclude, according to an embodiment of the present invention, since the first and second external electrodes include the conductive metal and the conductive amorphous metal including a (Cu, Ni)-bZr-c(Al, Sn) that satisfies conditions of a+b+c=100, 20≤a≤60, 20≤b≤60, and 2≤c≤25, the multilayered ceramic electronic component without the degradation of electrode connectivity between the internal electrodes and the external electrodes which may be caused after electrode firing and the defective plating due to the glass elution, may be implemented.

As set forth above, according to embodiments of the invention, external electrodes are formed by using amorphous metal, whereby a multilayered ceramic electronic component resolving a degradation of connectivity between external electrodes and internal electrodes, which may be generated after firing electrodes and defective plating due to a glass detachment may be implemented.

While the present invention has been shown and described in connection with the embodiments, it will be apparent to those skilled in the art that modifications and variations may be made without departing from the spirit and scope of the invention as defined by the appended claims.

What is claimed is:

1. A conductive paste for an external electrode, comprising:
   a conductive metal; and
   a conductive amorphous metal including a (Cu, Ni)-bZr-c(Al, Sn) satisfying conditions of a+b+c=100, 20≤a≤60, 20≤b≤60, and 2≤c≤25.

2. The conductive paste of claim 1, wherein an average particle diameter of the amorphous metal powder ranges from 0.5 μm to 5.0 μm.

3. The conductive paste of claim 1, wherein the conductive metal has the content of 40 to 60 parts by weight over 100 parts by weight of the conductive paste.

4. The conductive paste of claim 1, wherein the conductive metal is one or more selected from the group consisting of copper (Cu), nickel (Ni), silver (Ag), and silver-palladium (Ag—Pd).

5. A multilayered ceramic electronic component comprising:
   a ceramic main body including a dielectric layer;
   first and second internal electrodes disposed to face each other with the dielectric layer interposed therebetween within the ceramic main body; and
   a first external electrode electrically connected to the first internal electrodes and a second external electrode electrically connected to the second internal electrodes,
   the first and second external electrodes including the content of dissolved oxygen of 100 ppm or lower.

6. The multilayered ceramic electronic component of claim 5, wherein the first and second external electrodes are formed, by applying a conductive paste for an external electrode including a conductive metal, and a conductive amorphous metal including a (Cu, Ni)-bZr-c(Al, Sn) that satisfies conditions of a+b+c=100, 20≤a≤60, 20≤b≤60, and 2≤c≤25, to the ceramic main body.

7. The multilayered ceramic electronic component of claim 6, wherein an average particle diameter of the amorphous metal powder ranges from 0.5 μm to 5.0 μm.

8. The multilayered ceramic electronic component of claim 6, wherein the conductive metal has the content of 40 to 60 parts by weight over 100 parts by weight of the conductive paste.

9. The multilayered ceramic electronic component of claim 6, wherein the conductive metal is one or more selected from the group consisting of copper (Cu), nickel (Ni), silver (Ag), and silver-palladium (Ag—Pd).

10. A multilayered ceramic electronic component comprising:
   a ceramic main body including a plurality of dielectric layers;
   a plurality of first and second internal electrodes disposed to face each other with each of the dielectric layers interposed therebetween within the ceramic main body; and
   a first external electrode electrically connected to the first internal electrodes and a second external electrode electrically connected to the second internal electrodes,
   the first and second external electrodes having the content of dissolved oxygen of 100 ppm or lower.

11. The multilayered ceramic electronic component of claim 10, wherein the first and second external electrodes are formed by applying a conductive paste for an external electrode including a conductive metal, and a conductive amorphous metal including a (Cu, Ni)-bZr-c(Al, Sn) that satisfies conditions of a+b+c=100, 20≤a≤60, 20≤b≤60, and 2≤c≤25, to the ceramic main body.

12. The multilayered ceramic electronic component of claim 11, wherein an average particle diameter of the amorphous metal powder ranges from 0.5 μm to 5.0 μm.

13. The multilayered ceramic electronic component of claim 11, wherein the conductive metal has the content of 40 to 60 parts by weight over 100 parts by weight of the conductive paste.

14. The multilayered ceramic electronic component of claim 11, wherein the conductive metal is one or more selected from the group consisting of copper (Cu), nickel (Ni), silver (Ag), and silver-palladium (Ag—Pd).

15. A method of fabricating a multilayered ceramic electronic component, the method comprising:
   preparing a ceramic main body including a dielectric layer and first and second internal electrodes disposed to face each other with the dielectric layer interposed therebetween;
   preparing a conductive paste for an external electrode including a conductive metal, and a conductive amorphous metal including a (Cu, Ni)-bZr-c(Al, Sn) satisfying conditions of a+b+c=100, 20≤a≤60, 20≤b≤60, and 2≤c≤25;
   applying the external electrode paste to the ceramic main body so as to be electrically connected to the first and second internal electrodes; and
   firing the ceramic main body to form the first and second external electrodes.

16. The method of claim 15, wherein an average particle diameter of the amorphous metal powder ranges from 0.5 μm to 5.0 μm.

17. The method of claim 15, wherein the conductive metal has the content of 40 to 60 parts by weight over 100 parts by weight of the conductive paste.

18. The method of claim 15, wherein the conductive metal is one or more selected from the group consisting of copper (Cu), nickel (Ni), silver (Ag), and silver-palladium (Ag—Pd).

19. The method of claim 15, wherein the content of dissolved oxygen within the first and second external electrodes is 100 ppm or lower.

* * * * *